(12) United States Patent
Kosaka et al.

(10) Patent No.: US 6,554,501 B2
(45) Date of Patent: Apr. 29, 2003

(54) ACTUATOR CONTROL METHOD AND CONTROL DEVICE

(75) Inventors: Akira Kosaka, Yao (JP); Junichi Tanii, Izumi (JP); Shigeru Wada, Kishiwada (JP); Yoshihiro Hara, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/811,569

(22) Filed: Mar. 20, 2001

(65) Prior Publication Data

US 2001/0026687 A1 Oct. 4, 2001

(30) Foreign Application Priority Data

Mar. 22, 2000 (JP) ........................................ 2000-080048

(51) Int. Cl.[7] ................................................. G03B 9/08
(52) U.S. Cl. ....................................... 396/452; 396/502
(58) Field of Search ................................. 396/452, 502

(56) References Cited

U.S. PATENT DOCUMENTS

| | | | |
|---|---|---|---|
| 4,664,493 A | * 5/1987 | Takagi | ........................ 396/443 |
| 5,008,699 A | 4/1991 | Tominaga et al. | |
| 5,185,621 A | * 2/1993 | Kagechika | ................... 396/248 |
| 5,459,544 A | * 10/1995 | Emura | ........................ 396/257 |
| 6,276,847 B1 | * 8/2001 | Richiuso et al. | ............ 396/472 |

FOREIGN PATENT DOCUMENTS

| | | |
|---|---|---|
| JP | 6-265075 | 9/1994 |
| JP | 7-164370 | 6/1995 |

* cited by examiner

Primary Examiner—Russell Adams
Assistant Examiner—Michelle Nguyen
(74) Attorney, Agent, or Firm—Morrison & Foerster LLP

(57) ABSTRACT

A control device for control an actuator comprises a 'shape-memory alloy that recovers to prescribed memory dimensions' and 'a force application means that applies an external force to the shape-memory alloy and changes its dimensions' has a pre-heating means that, prior to the control of a driven member by the actuator, pre-heats the shape-memory alloy to a temperature at which the shape-memory alloy begins to change its shape or to a slightly lower temperature relative thereto.

14 Claims, 13 Drawing Sheets

ACTUATOR CONTROL METHOD AND CONTROL DEVICE

This application is based on application No. 2000-80048 filed in Japan, the content of which is hereby incorporated by reference.

FIELD OF THE INVENTION

The present invention relates to a control method for an actuator including a shape-memory alloy and a control device for the actuator.

DESCRIPTION OF THE RELATED ART

The demand for a small-sized position control mechanism, such as a hand shake correcting mechanism for a lens shutter camera, for example, has increased in recent years. An actuator that can meet this demand may comprise an actuator in which a shape-memory alloy (SMA) and a spring are used.

In an actuator using a shape-memory alloy, a shape-memory alloy that recovers to prescribed dimensions is used, and its temperature is controlled through the control of current that is supplied to the shape-memory alloy. Consequently, the shape-memory alloy is returned to the memory dimensions where necessary.

The temperature (point As) at which the shape-memory alloy begins to change its shape in order to return to the memory dimensions is determined based on the mixture ratio of the nickel and titanium that comprise the shape-memory alloy. The point As is set to a temperature slightly higher than the ambient temperature in order to avoid the situation in which the shape-memory alloy begins to change its shape when it is not intended to do so. For example, in the case of a camera, which is regularly used in everyday life, the point As is preferably 70° C. to 80° C.

However, if the point As is set to be higher than the ambient temperature, the problem arises that, when it is in fact desired that a change occur in the shape of the shape-memory alloy, a time lag occurs between the time at which application of voltage is begun and the time at which the shape-memory alloy actually reaches the point As, such that precise position control cannot be obtained. On the other hand, if the point As is set at a lower temperature in order to reduce the time lag, there is a possibility that the shape-memory alloy will begin to change its shape when it is not intended to.

SUMMARY OF THE INVENTION

An object of the present intention is to provide a position control device by which the unintended shape change of shape-memory alloy is prevented through the setting of the point As set at a high temperature, and using which very little time lag occurs when it is actually desired to change the shape of the shape-memory alloy.

The present invention was created in order to effectively resolve the above problems and provides a control device having the following features.

In the control device of the present invention, the actuator comprises a 'shape-memory alloy that recovers to prescribed memory dimensions' and 'a force application means that applies an external force to the shape-memory alloy and changes its dimensions'. The position of a driven member in a first direction in which the shape-memory alloy returns to its memory dimensions, and in a second direction in which the force application means changes the dimensions of the shape-memory alloy, is controlled by the actuator. The control device of the present invention has a pre-heating means that, prior to the control of the driven member by the actuator, pre-heats the shape-memory alloy to a temperature at which the shape-memory alloy begins to change its shape or to a slightly lower temperature relative thereto.

In the control device of the present invention having the above construction, because the shape-memory alloy comprising the actuator is pre-heated to a temperature just short of the temperature (the point As) at which it starts to change its shape, when the applied voltage is increased in order to actually induce shape change, the shape-memory alloy begins to change its shape with very little time lag. Therefore, the degree of precision in position control increases, and it is also not necessary to set a low point As. The pre-heating means may heat the shape-memory alloy to a temperature higher than the above temperature in the initial stage of pre-heating. Using this construction, the time period needed for the shape-memory alloy to reach the desired pre-heated temperature may be reduced.

In the above control device, it is further preferred that a stopper that limits to a prescribed value the maximum amount of shape change of the shape-memory alloy carried out by the force application means. Using this construction, the initial position of the driven member before the shape-memory alloy begins to change its shape toward the memory dimensions due to heating may be accurately maintained at a constant position.

The above control device is suitable for position control of the shutter of a camera, and in such a case, it is preferred that the pre-heating means begin to supply current to the shape-memory alloy when the switch to begin various photo-taking preparation processes is turned ON.

The pre-heating means in the control device of the present invention may pre-heat the shape-memory alloy so that the driven member may be moved to a prescribed reference position before the control of the driven member by the actuator. This control device is suitable for position control of the correcting optical system of a camera having a hand shake correcting function, and in such a case, the center of the optical axis of the photo-taking optical system comprises the above reference position. It is preferred in this case as well that the pre-heating means begin to supply current to the shape-memory alloy when the switch to begin various photo-taking preparation processes is turned ON. The pre-heating means may heat the shape-memory alloy in the initial stage of pre-heating to a temperature higher than the temperature corresponding to the above reference position. Using this construction, the time period needed for the driven member to reach the reference position may be reduced.

Where the control device of the present invention is used in the shutter mechanism or hand shake correcting mechanism of a camera, the pre-heating means may be constructed such that it stops the supply of current when the photo-taking switch is not turned ON after the passage of a prescribed time period after the switch to begin photo-taking preparation processes is turned ON. Using this construction, where the shutter release button is pressed halfway down by accident and is maintained in that state for a long time, wasteful power consumption may be prevented.

In the control device of the present invention, the force application means may comprise a spring such as a bias spring, but the force application means itself may also comprise a shape-memory alloy. Where the force application means also comprises a shape-memory alloy, when current is being supplied to one of the shape-memory alloys (i.e., when pre-heating or full drive is being carried out), it is preferred that pre-heating be carried out with the other shape-memory alloy. Using this construction, highly precise position control with very little time lag may be attained regardless of whether the driven member is driven in the first or second direction.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1A:
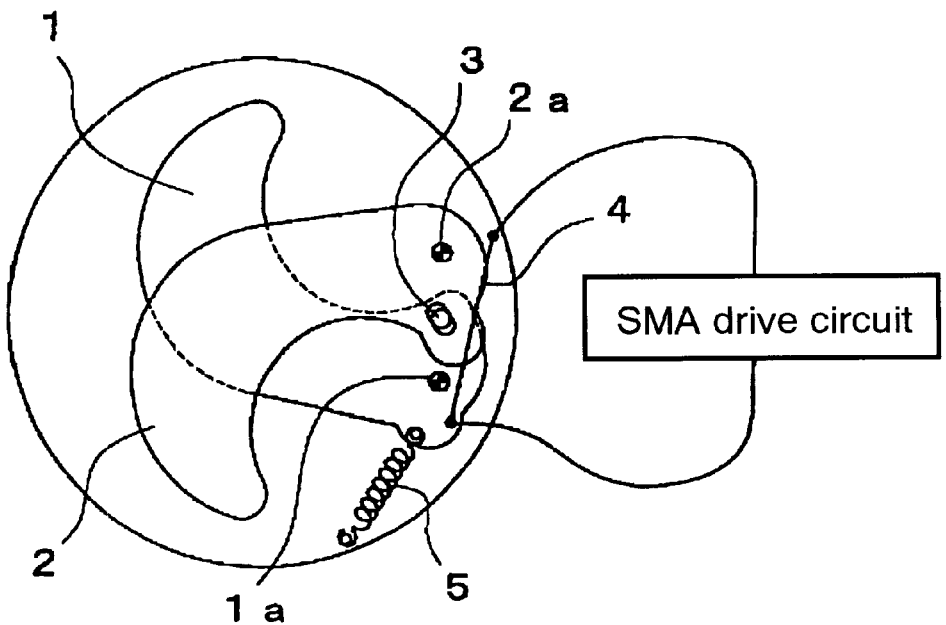
FIG. 1A and FIG. 1B are basic drawings to explain a shutter mechanism that is driven by the control device of the present invention.
Figure 1B:
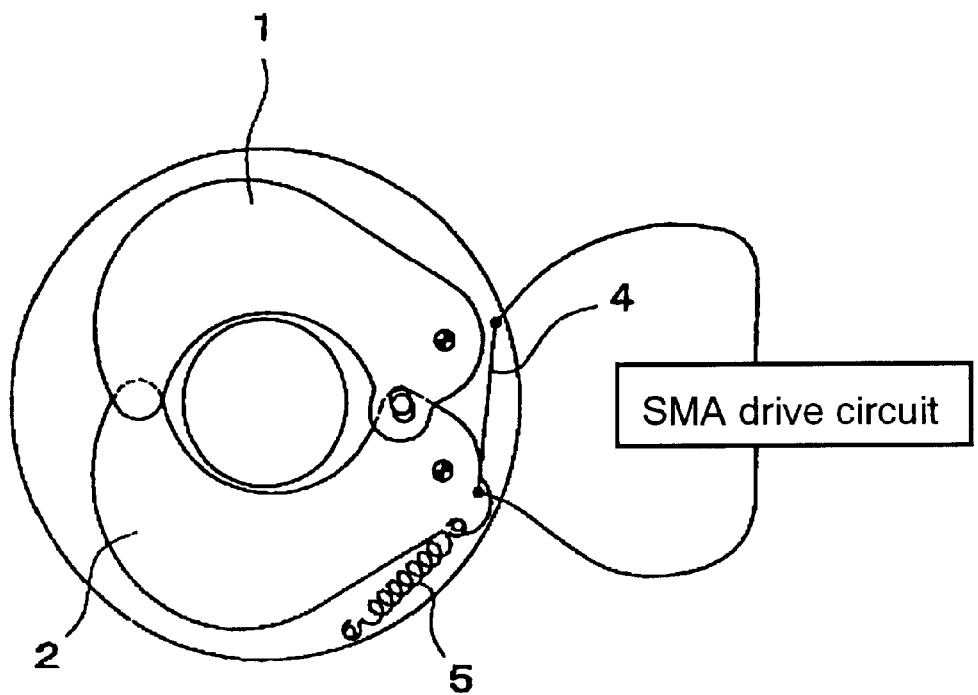
Figure 2:
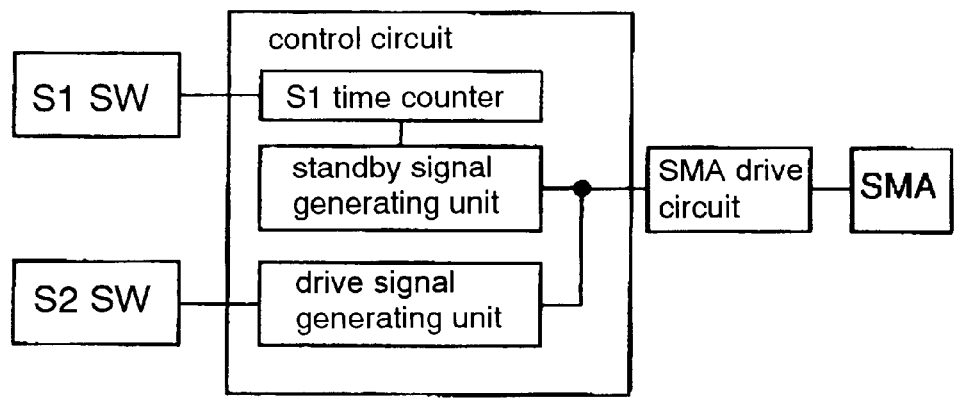
FIG. 2 is a control block diagram of the shutter mechanism of the present invention.

The embodiments of the present invention are explained in detail below with reference to the accompanying drawings. FIG. 1A is a basic drawing showing the shutter mechanism constructed in accordance with the present invention when the shutter is closed, and FIG. 1B is a basic drawing showing said shutter mechanism when the shutter is open. FIG. 2 is a control block diagram of the shutter mechanism.

The shutter blades 1 and 2 are constructed such that they can rotate around the rotation shafts 1a and 2a, respectively, and are mutually connected via a connecting pin 3. Connected to one of them, i.e., to the shutter blade 1, is a wire-shaped shape-memory alloy (SMA) 4 and a bias spring 5. The SMA 4 and the bias spring 5 function as an actuator that drives the shutter blade 1. In other words, the position of the shutter blade 1, which comprises a driven member, is controlled based on the control of the force of the SMA 4 to return to its memory shape and the force of the bias spring 5, which comprises a force application means, to pull the SMA 4. When the shutter blade 1 is driven, the shutter blade 2, which is linked to the shutter blade 1 via the connecting pin 3, is also driven, and therefore, the shutter mechanism may be controlled to open or close using the above actuator. Both ends of the SMA 4 are connected to an SMA drive circuit, and are controlled by a control circuit shown in FIG. 2.

In FIG. 2, the switch S1 is a photo-taking preparation start switch, and turns ON when the shutter release button is pressed halfway down. When the switch S1 is turned ON, photo-taking preparation processes such as light measurement and distance measurement are begun. The switch S2 is a photo-taking start switch, and turns ON when the shutter release button is completely pressed down. As can be seen from FIG. 2, when the switch S1 is turned ON, a standby signal is sent to the SMA drive circuit from the standby signal generating unit, and when the switch S2 is turned ON, a full drive signal is sent to the SMA drive circuit from drive signal generating unit. When a standby signal is received, the SMA drive circuit supplies a standby current, which is described below, to the SMA 4, and when a full drive signal is received, it supplies a full drive current to the SMA 4, which is described below.

Figure 3:
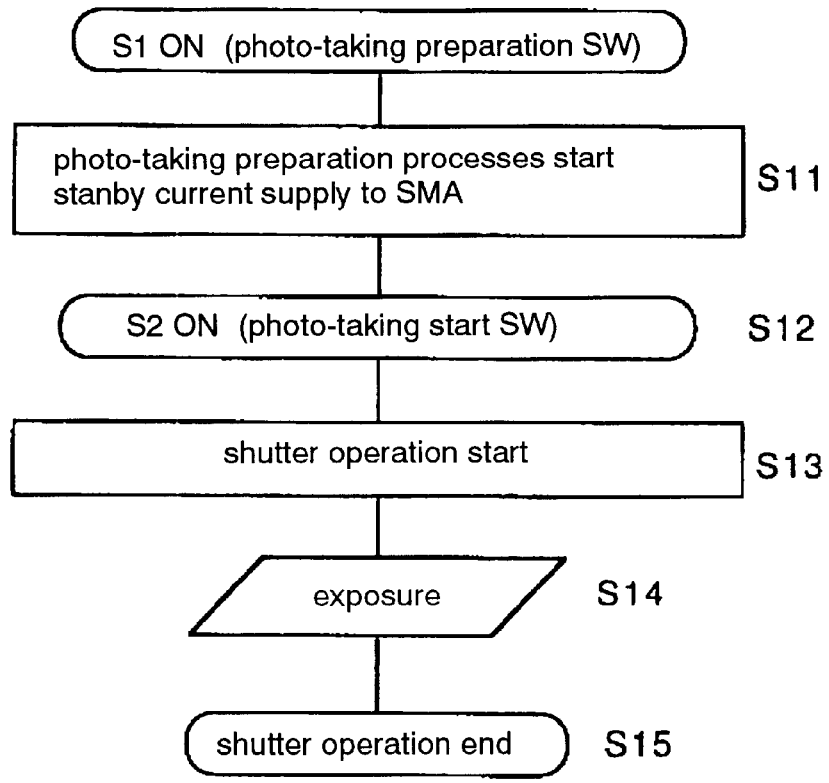
FIG. 3 is a flow chart to explain the control of the shutter mechanism of the present invention.

As shown in the flow chart of FIG. 3, when the switch S1 is turned ON, photo-taking preparation processes are begun and a standby current is supplied to the SMA 4 as well (S11). The camera waits in this state for the switch S2 to be turned ON, and when the switch S2 is actually turned ON (S12), a full drive current is supplied to the SMA 4, whereupon the SMA 4 begins to change its shape (i.e., begins to shrink). As a result, a shutter operation is begun, and it is finished at the completion of exposure (S13→S14→S15).

Figure 4:
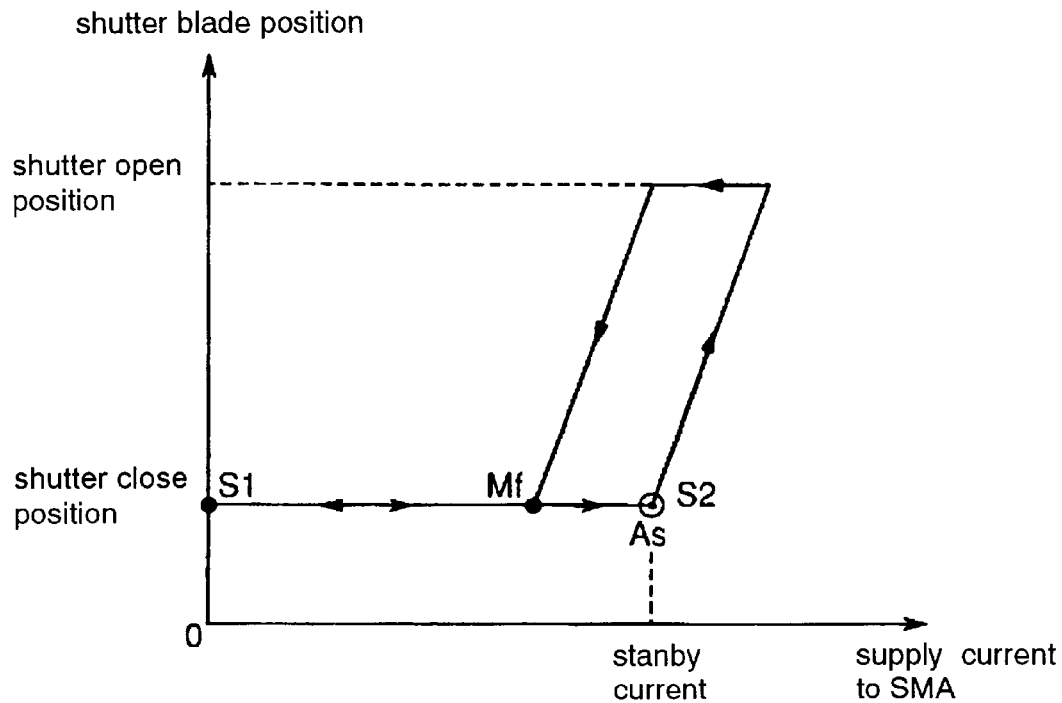
FIG. 4 is a graph showing the relationship between the position of the shutter blade and the level of current supplied to the SMA in the shutter mechanism of the present invention.
Figure 5:
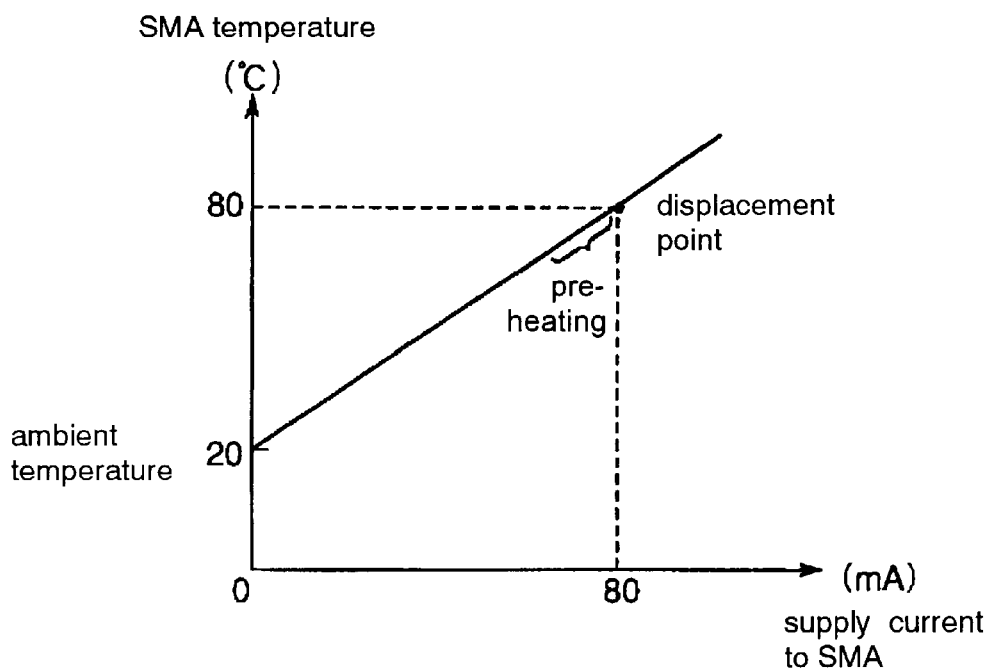
FIG. 5 is a graph showing the relationship between the level of current supplied to the SMA and the temperature thereof.

FIG. 4 is a graph showing the relationship between the position of the shutter blade and the level of current supplied to the SMA. FIG. 5 is graph showing the relationship between the level of current supplied to the SMA and the temperature thereof. As can be seen from FIG. 5, because the level of current and the SMA temperature have a one-to-one relationship, if the level of current supplied to the SMA is controlled, the temperature of the SMA may be controlled. In the example shown in the drawing, the point As (the temperature at which the SMA begins to change its shape) of the SMA 4 is set to 80° C., and when the level of current supplied to the SMA 4 is made 80 mA, the SMA 4 begins to change its shape. A level slightly lower than 80 mA is used for the standby current, and as a result, the SMA 4 may be pre-heated to the 80° C. temperature at which shape change begins, or to a temperature slightly lower than that.

When the switch S1 is turned ON, a standby current is supplied to the SMA 4, whereupon pre-heating takes place.

In this state, the SMA 4 does not begin to change its shape, and even if it does, the degree of change is so small that the shutter remains closed (see FIG. 4). When the switch S2 is turned ON, a full drive current (80 mA, or a level slightly larger than that in this embodiment) is supplied to the SMA 4, whereupon the shutter opens. When the power supply to the SMA 4 is subsequently stopped, the shutter is closed due to the force from the bias spring 5.

Figure 6:
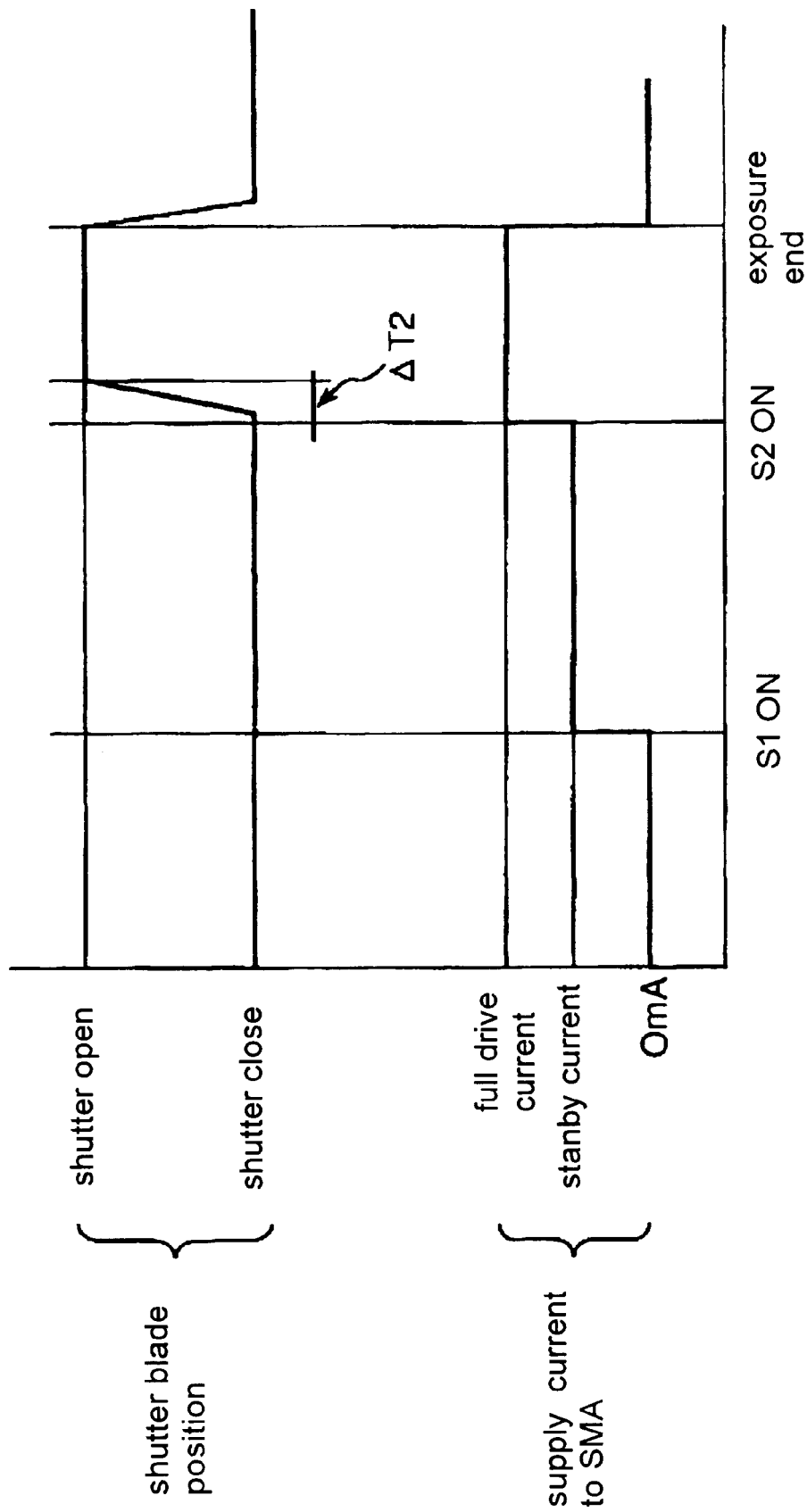
FIG. 6 is a timing chart showing the relationship between the position of the shutter blade and the current input to the SMA in the shutter mechanism of the present invention.
Figure 7:
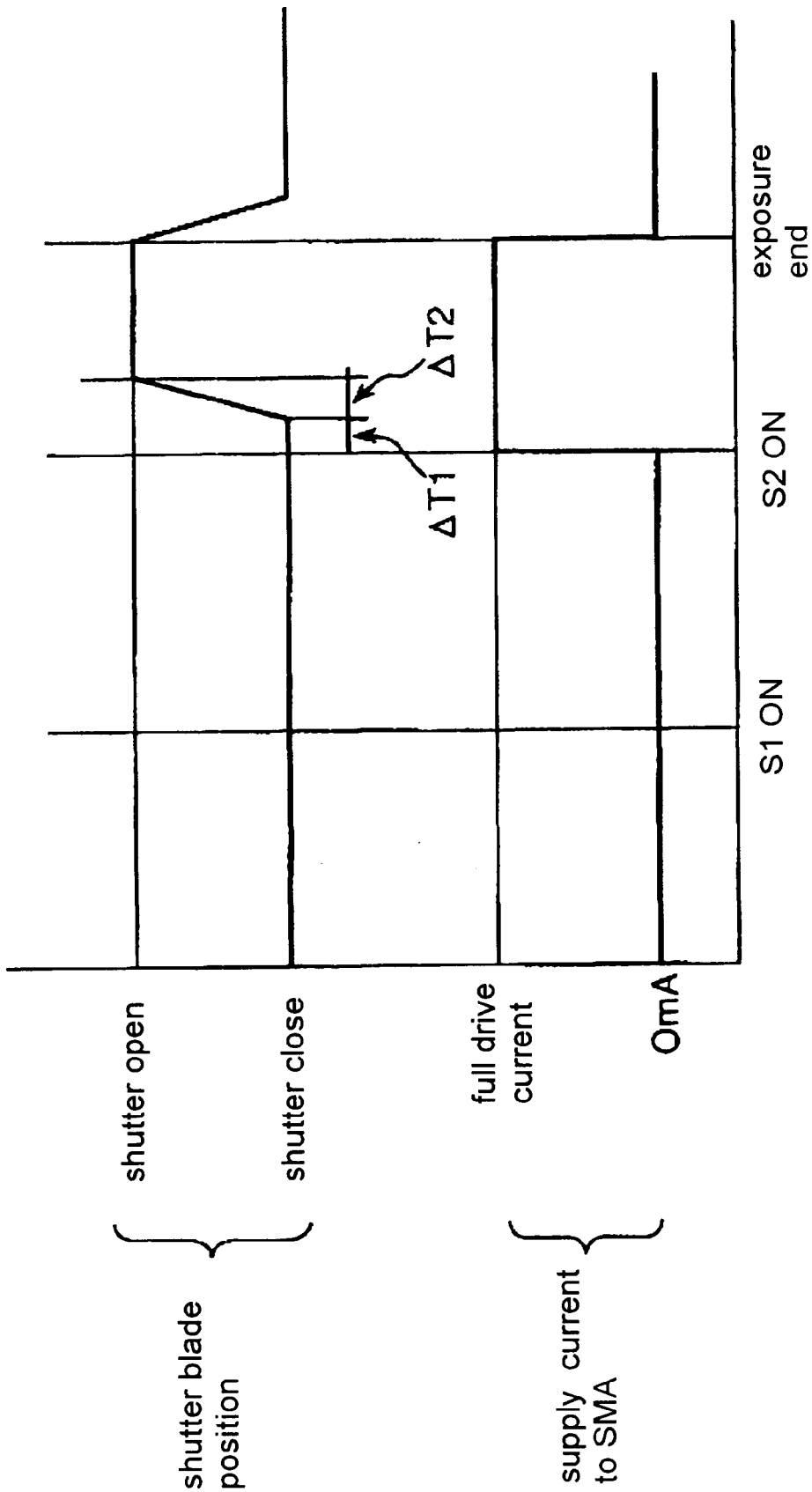
FIG. 7 is a timing chart corresponding to FIG. 6 in the case in which no standby current is used.

FIG. 6 is a timing chart showing the relationship between the position of the shutter blade and the current input to the SMA. When the switch S1 is turned ON, a standby current is supplied and pre-heating begins. When the switch S2 is subsequently turned ON, the SMA 4 changes its shape and the shutter opens. The effect of the pre-heating based on the standby current may be well understood by comparing FIGS. 6 and 7. FIG. 7 shows a timing chart in a case in which a standby current is not used. In FIG. 7, no current is input to the SMA during the time after the switch S1 is turned ON until the switch S2 is turned ON, and a full drive current is supplied to the SMA only after the switch S2 is turned ON.

In FIG. 7, the time lag between the turning ON of the switch S2 and the actual opening of the shutter is expressed as the sum of ΔT1 and ΔT2. ΔT1 is the time needed for the temperature of the SMA 4 to reach the point As after the commencement of current supply, and ΔT2 is the time needed after the shutter begins to open until it completes opening. It can be seen that, through the use of pre-heating, the above ΔT1 is reduced to almost zero in the present invention (FIG. 6) employing a standby current.

Figure 8:
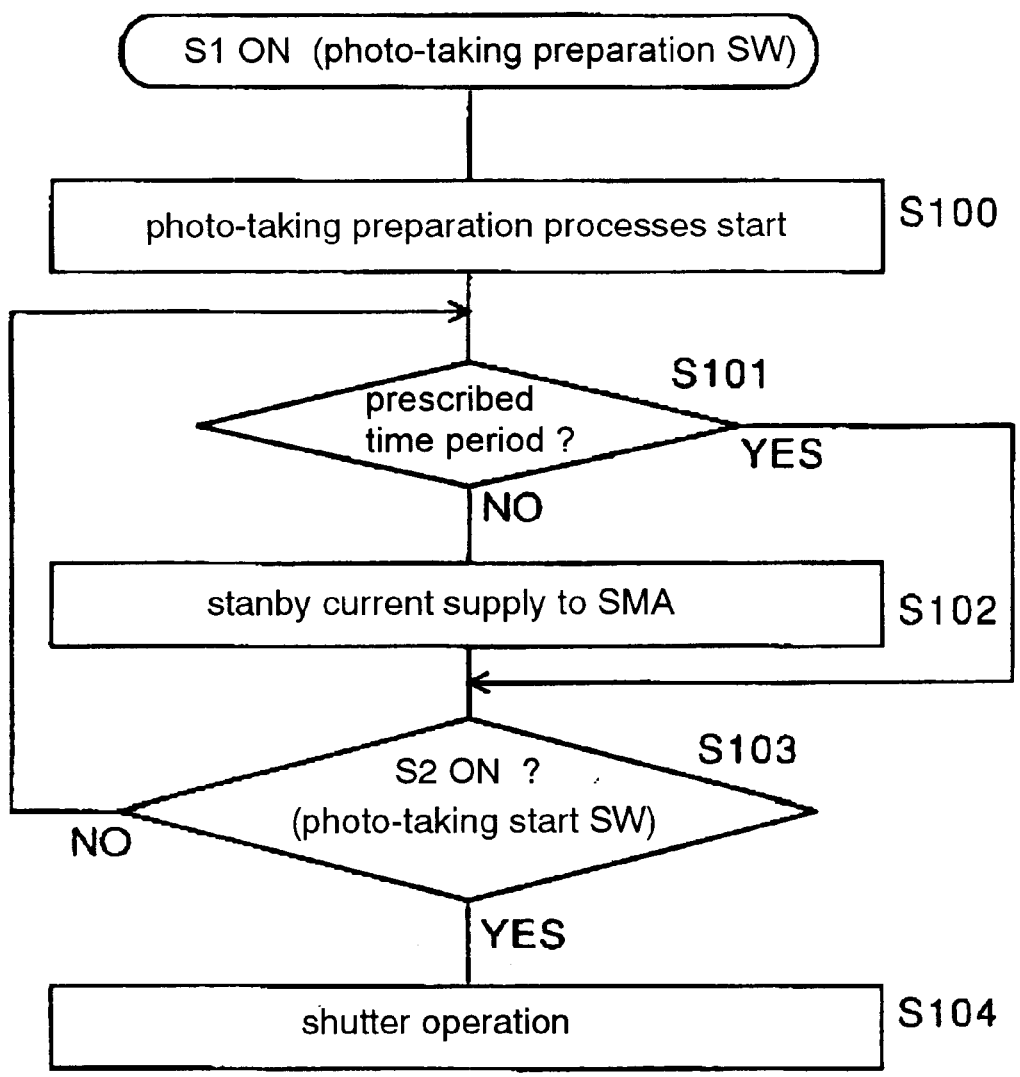
FIG. 8 is a flow chart to explain one example of control in regard to the shutter mechanism of FIG. 1.

A program mode may be set in which the power supply for the standby current is stopped if the switch S2 is not turned ON even after a prescribed time period has elapsed after the switch S1 is turned ON. Consequently, where the shutter release button is pressed halfway down by accident and is maintained in that state for a long time, for example, wasteful power consumption may be prevented. This is shown in the flow chart of FIG. 8.

When the switch S1 is turned ON, photo-taking preparation processes begin (S100), and the S1 time counter in FIG. 2 begins time counting. A standby current is continuously supplied to the SMA until a prescribed preset time period (one minute, for example) elapses (S101→S102→S103→S101), but where the switch S2 is not turned ON after the passage of the prescribed time period, the supply of the standby current is stopped (S101→S103→S101). When the switch S2 is turned ON, a full drive current is supplied, whereupon the shutter blades begin to operate (S104).

Figure 9A:
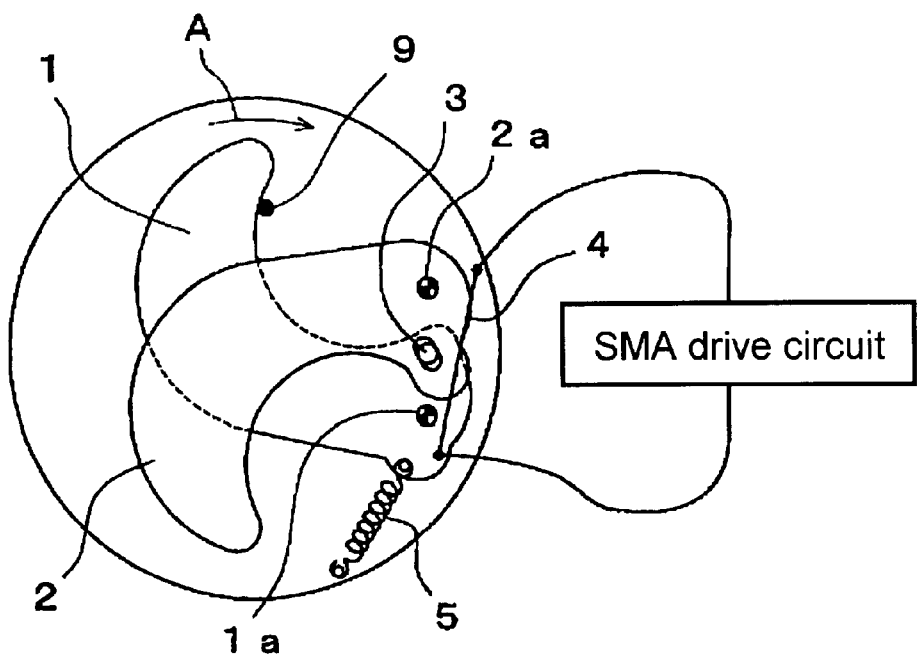
FIG. 9A and FIG. 9B are basic drawings showing a modified example of the shutter mechanism of the present invention.
Figure 9B:
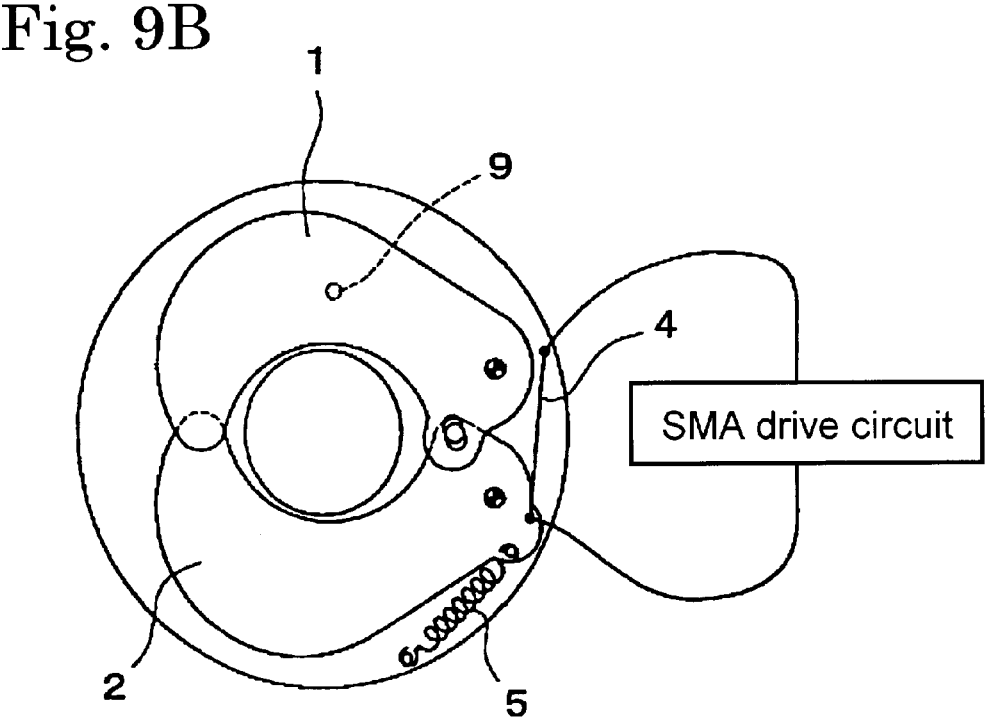

FIG. 9A and FIG. 9B show a modified example of the present invention. The shutter mechanism in FIG. 9A and FIG. 9B differs from the shutter mechanism shown in FIG. 1A and FIG. 1B in that it has a stopper protrusion 9. In the example of FIG. 1A, the bias spring 5 is in the state in which it is compressed to the maximum extent when the shutter is closed. By contrast, in the example of FIG. 9A, the bias spring 5 can be still further compressed when the shutter is closed. However, the bias spring 5 is prevented by the stopper protrusion 9 from becoming further compressed. Therefore, if the stopper protrusion 9 did not exist, the bias spring 5 would be further compressed, and the shutter blade 1 would further rotate in the direction of the arrow A. In other words, the stopper protrusion 9 prohibits the maximum length (the maximum shape change amount) of the SMA 4 due to the pulling by the bias spring from exceeding the length in FIG. 9A. Using this construction, the shutter blades 1 and 2 may be precisely positioned regardless of the strength of the bias spring 5 when the shutter is closed, avoiding the problem of the strength of the bias spring 5 being too large and the amount of rotation of the shutter blade from the closed position to the open position becoming unnecessarily large.

Figure 10:
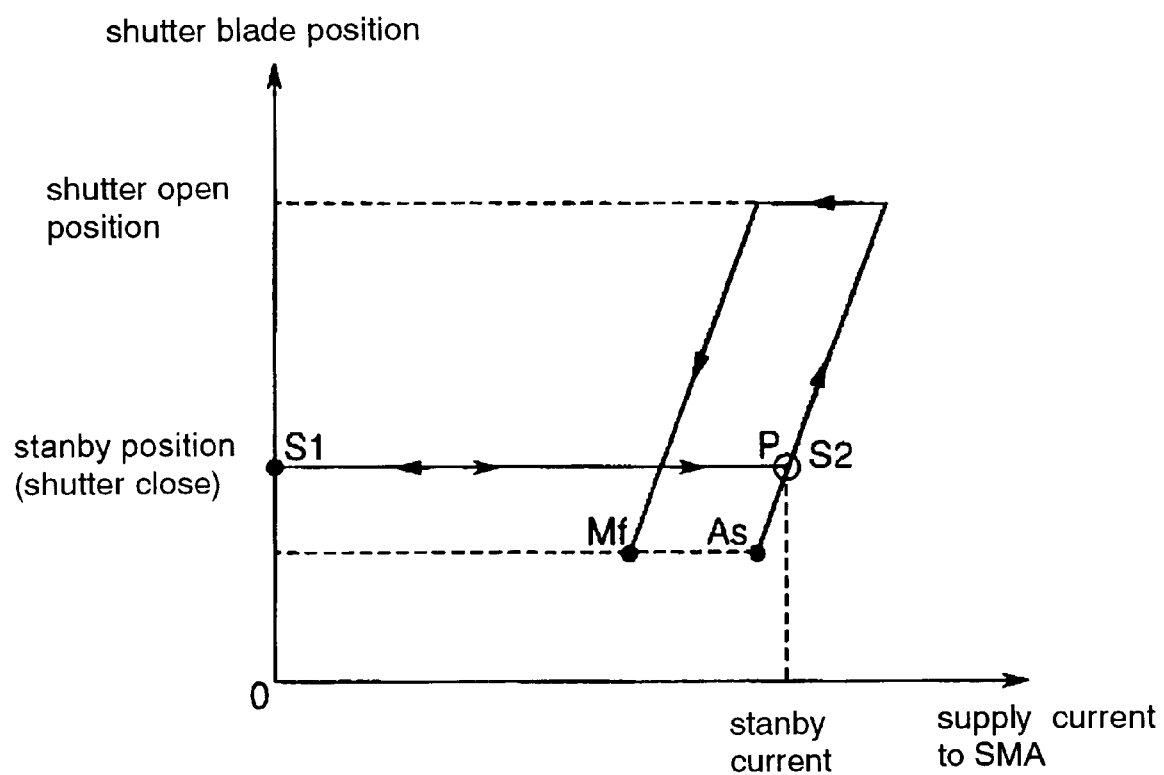
FIG. 10 is a graph showing the relationship between the position of the shutter blade and the level of current supplied to the SMA in the shutter mechanism of the modified example.

FIG. 10 is a graph showing the relationship between the position of the shutter blade and the level of current supplied to the SMA in the mechanism that includes a stopper protrusion 9, and corresponds to FIG. 4. If the stopper protrusion 9 did not exist, the shutter closed position would fall to the dotted line in the lower part in the graph, so that the difference between the closed position and the open position (i.e., the amount of rotation of the shutter blade) would increase, but it is seen that this is effectively prevented by the stopper protrusion 9. In this example, because the shutter is closed until the SMA is heated to the point P in FIG. 10, the level of standby current must be larger than the level of current corresponding to the point As.

Figure 11A:
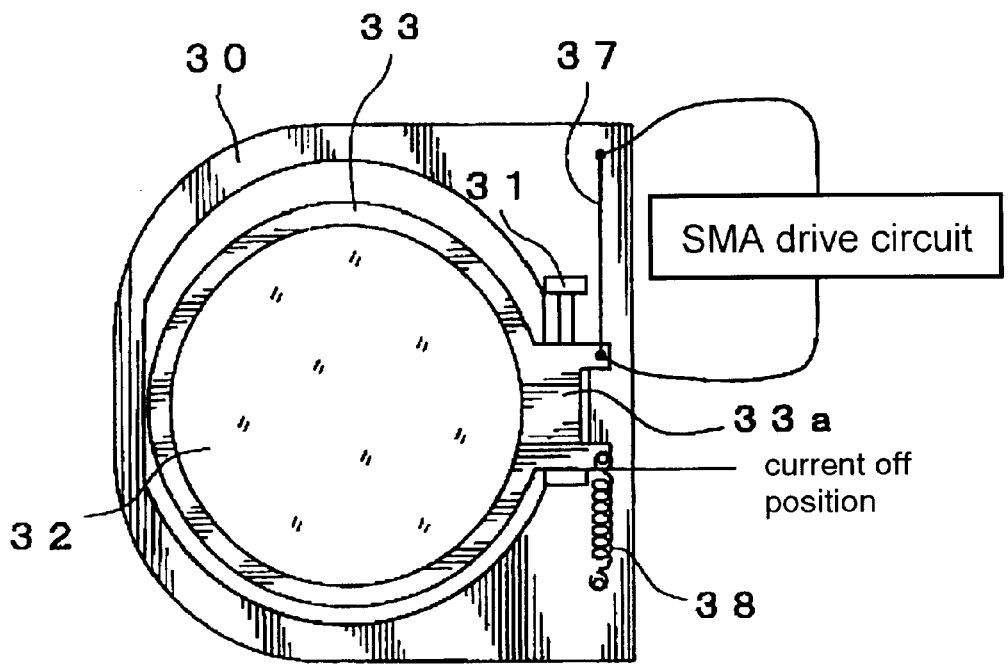
FIG. 11A and FIG. 11B are basic drawings to explain a hand shake correcting mechanism that is driven by the control device of the present invention.
Figure 11B:
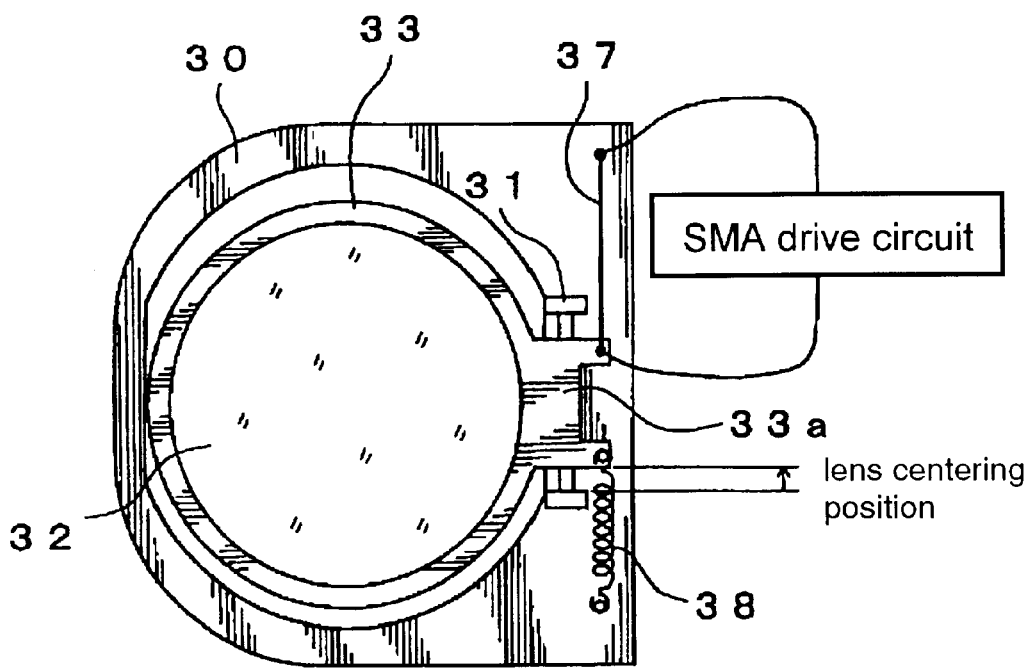

FIG. 11A and FIG. 11B are basic drawings to explain an embodiment in which the control device of the present invention is used in a camera having a hand shake correcting function, and shows the correcting lens, which is incorporated in the photo-taking optical system, by itself. The actuator comprises an SMA and a bias spring in this embodiment as well.

The sliding unit 33a of the lens holder 33 that supports the correcting lens 32 is engaged with a guide rod 31 fixed to the base 30 such that it may slide. An SMA 37 and a bias spring 38 are fixed to the sliding unit 33a. FIG. 11A shows a situation in which the supply of current to the SMA 37 is put on hold, and FIG. 11B shows a situation in which a standby current is being supplied to the SMA 37. In this embodiment, the SMA 37 is pre-heated through the supply of a standby current, and the correcting lens 32, which comprises a driven member, moves to the center of the optical axis of the photo-taking optical system (the centering position).

Figure 12:
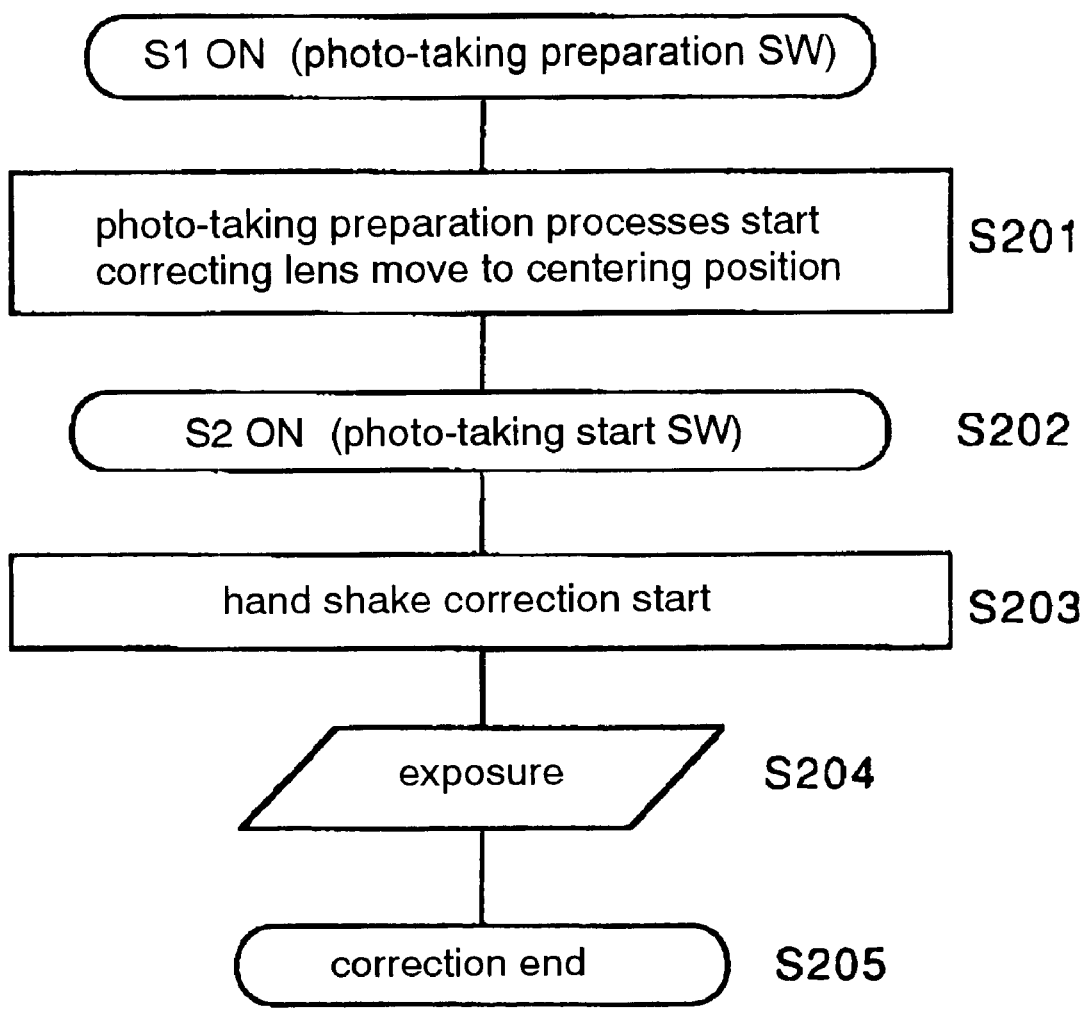
FIG. 12 is a flow chart to explain the control of the hand shake correcting mechanism.

To explain with reference to the flow chart of FIG. 12, when the switch S1 is turned ON, photo-taking preparation processes are begun, and a standby current is supplied to the SMA 37 (S201). When the standby current is supplied, the SMA 37 shrinks, whereupon the correcting lens 32 moves from the position in FIG. 11A to the centering position in FIG. 11B. In other words, the level of standby current is set to a value that corresponds to the SMA 37 in the state shown in FIG. 11B. The camera waits in this state for the switch S2 to turn ON, and when the switch S2 is actually turned ON (S202), hand shake correcting control is begun, and is finished at the completion of exposure (S203→S204→S205). Hand shake correcting control is carried out through the control of the voltage that is applied to the SMA 37 by the SMA drive circuit, which begins such application of voltage upon receiving a signal from a control circuit not shown in the drawings.

Figure 13A:
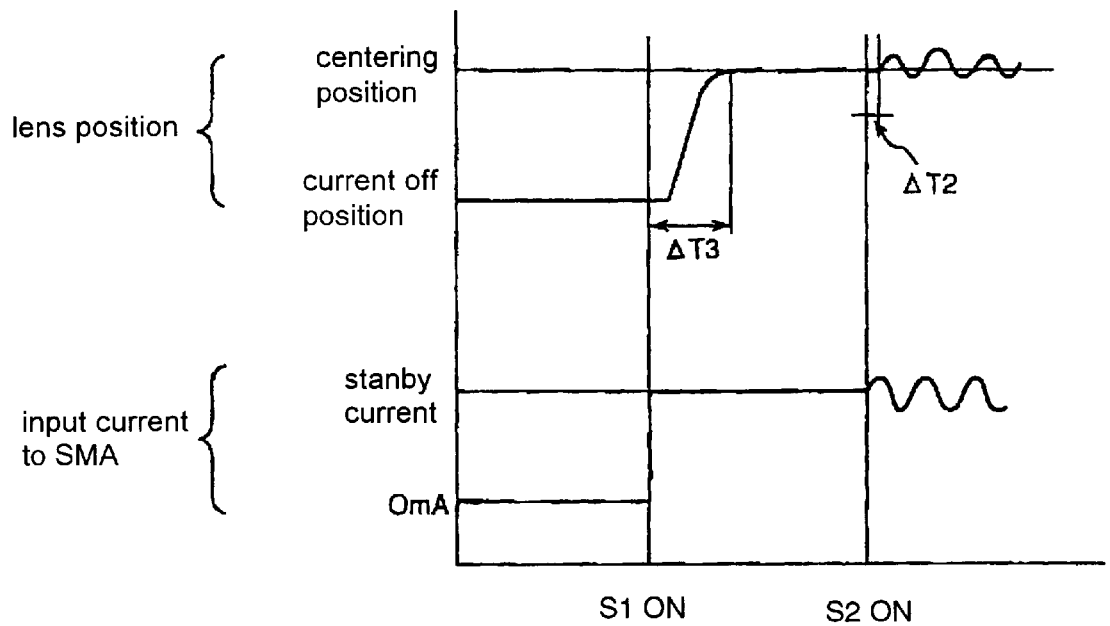
FIG. 13A and FIG. 13B are timing charts showing the relationship between the position of the correcting lens and the current input to the SMA in the hand shake correcting mechanism.
Figure 13B:
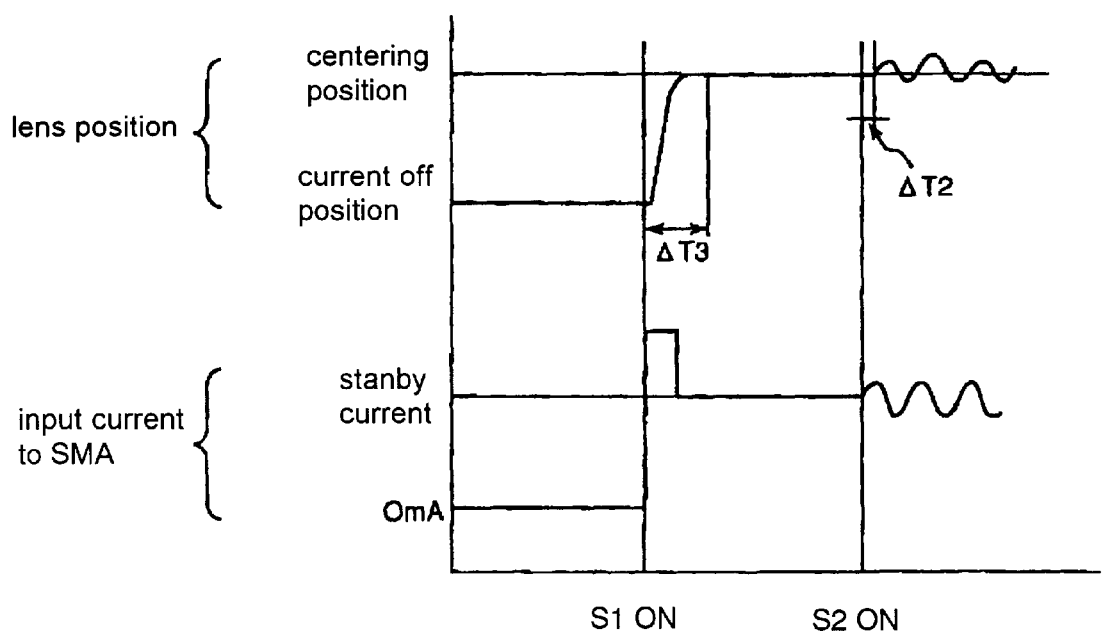
Figure 14:
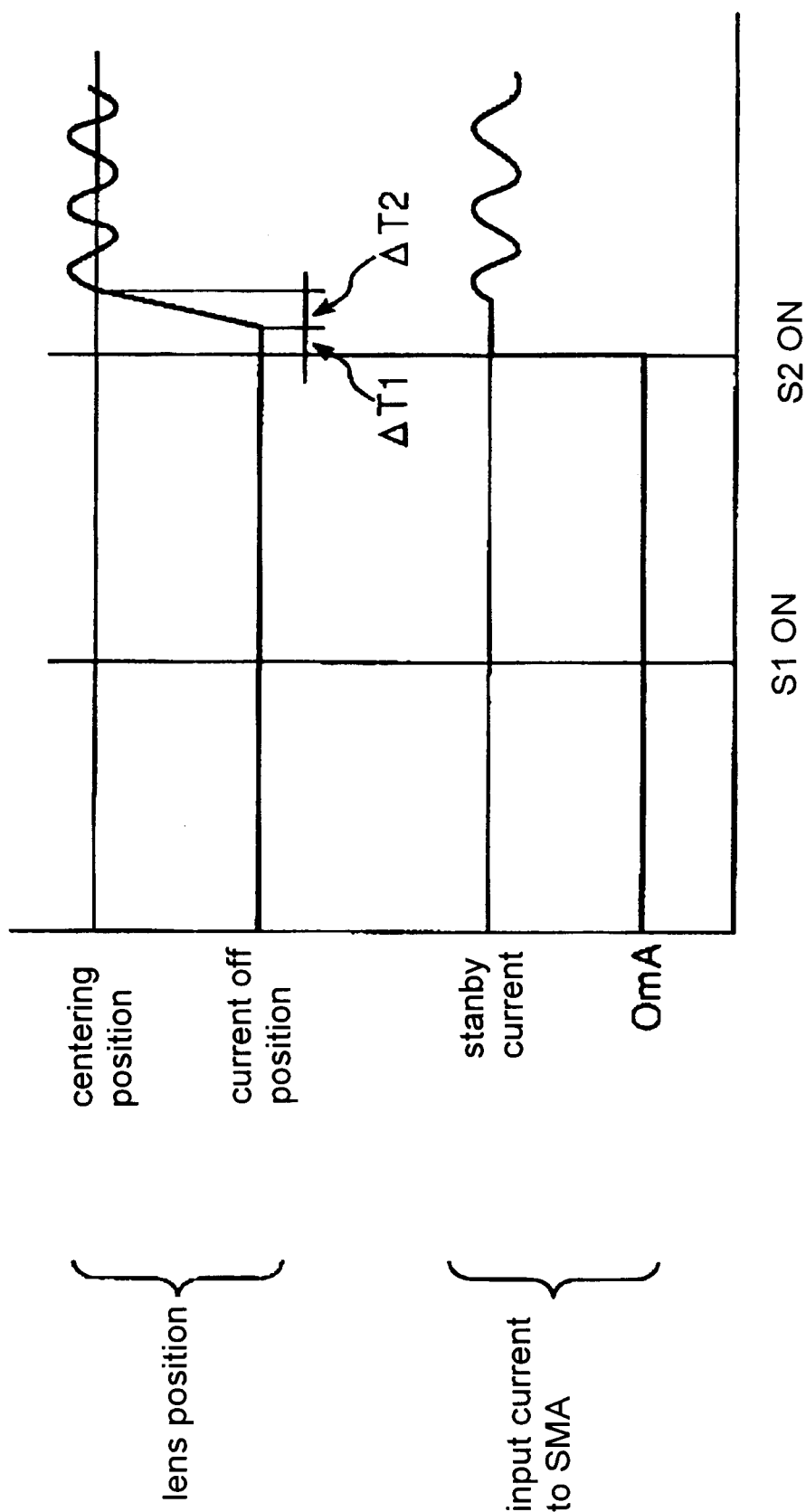
FIG. 14 is a timing chart corresponding to the FIG. 13A and FIG. 13B in the case in which no standby current is used.

FIG. 13A and FIG. 13B are timing charts showing the relationship between the position of the correcting lens and the current input to the SMA. When the switch S1 is turned ON, a standby current is supplied and the correcting lens 32 moves to the centering position. When the switch S2 is subsequently turned ON, hand shake correcting control by the SMA drive circuit is begun. The effect of the pre-heating based on the standby current may be well understood by comparing FIGS. 13A, 13B and 14. FIG. 14 shows a timing chart in the case in which a standby current is not used. In FIG. 14, no current is input to the SMA during the time after the switch S1 is turned ON until the time that the switch S2 is turned ON, and a full drive current is supplied to the SMA only after the switch S2 is turned ON.

In FIG. 14, the time lag between the turning ON of the switch S2 and the actual commencement of hand shake correction is expressed as the sum of ΔT1 and ΔT2. ΔT1 is the time needed for the temperature of the SMA 37 to reach the point As after the commencement of current supply, and ΔT2 is the time needed after the correcting lens begins to move toward the centering position until it arrives at said position and correction is begun. It can be seen that, through the use of pre-heating, the above ΔT1 is reduced to zero in the present invention (FIG. 13A) in which a standby current is applied. In addition, because the correcting lens is already at the centering position, ΔT2 itself is substantially improved. Furthermore, if a current larger than the current corresponding to the centering position is supplied for a certain period of time after the application of a standby current, as shown in FIG. 13B, ΔT3 (the time needed for the correcting lens to move from the current OFF position to the centering position) may also be improved. While only a mechanism that moves the correcting lens in the vertical directions in the drawing is shown in FIGS. 11A and 11B, in actual hand shake correction, the correcting lens must be moved in two perpendicular directions. This can be achieved if another correcting lens that is controlled to move in the horizontal directions in FIG. 11A and FIG. 11B is included, or if the base 30 itself is controlled to move in the horizontal directions using the same construction as described above, for example.

Figure 15A:
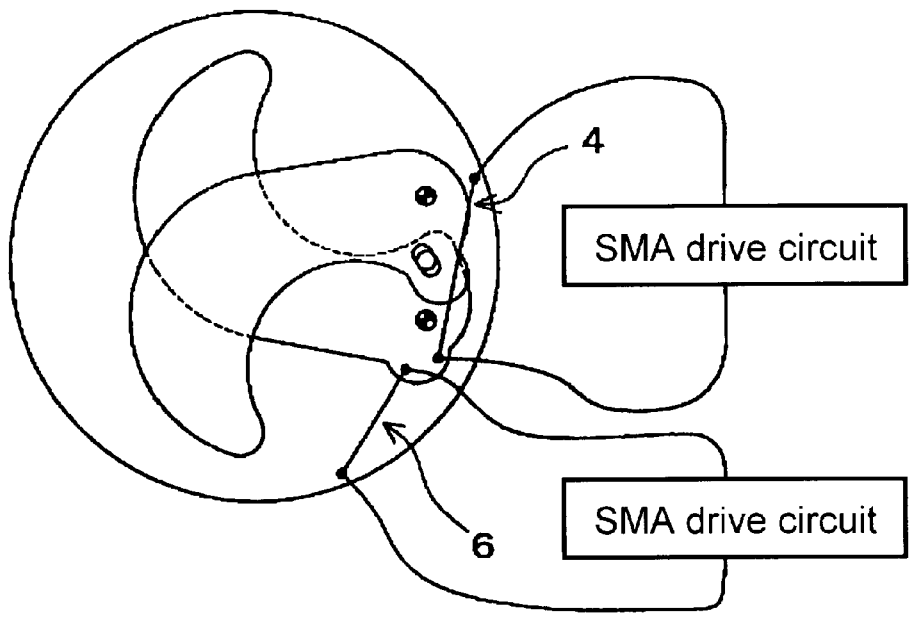
FIG. 15A and FIG. 15B are basic drawings to explain the control device of the present invention that uses two SMAs.
Figure 15B:
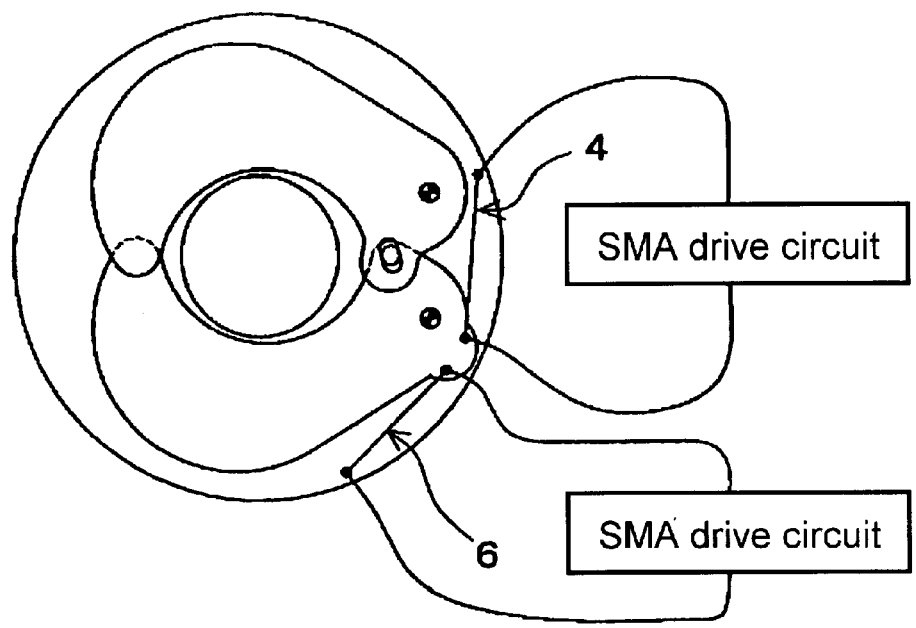

In each embodiment explained above, the actuator comprised an SMA and a bias spring (force application means), but in place of a bias spring, which comprises a force application means, gravity or inertia may be used, or another SMA may be used. FIG. 15A and FIG. 15B shows an example in which the bias spring 5 in the shutter mechanism of FIG. 1A and FIG. 1B is replaced with an SMA 6. The rest of the construction is the same as in the case shown in FIG. 1A and FIG. 1B.

Where the shutter mechanism is moved from the closed position in FIG. 15A to the open position in FIG. 15B, control to shrink the SMA 4 is performed. Where the shutter mechanism is moved from the open position in FIG. 15B to the closed position in FIG. 15A, while the pulling force of the bias spring 5 was used in the example of FIG. 1A and FIG. 1B, the same effect is achieved via the control to shrink the SMA 6 in this example. This construction may naturally be used in the example of FIG. 11A and FIG. 11B, in which hand shake correcting control is carried out.

Where position control is performed using two SMAs, it is preferred that, if a standby current or full drive current is being supplied to one of them, a standby current is being supplied to the other SMA. Consequently, precise position control with little time lag may be achieved regardless of which SMA is driven.

A standby current is continuously supplied in each embodiment described above, but it is also possible to make the current supply intermittent, from the standpoint of energy conservation.

The control device of the present invention may be used not only in the embodiments explained above, but also in other drive mechanisms, such as the aperture mechanism of a camera, etc. Where it is used in a camera, while it is preferred that pre-heating begin when the switch to begin the photo-taking preparation processes is turned ON, as described above, in a construction in which the shutter is automatically released upon the completion of aperture operation, pre-heating of the shape-memory alloy may begin when the aperture operation begins.

Other possible applications include a case in which pre-heating is begun when the main switch of the apparatus is turned ON. Where computers are concerned, this is a case in which the control device of the present invention is used in the swing arm drive mechanism in the hard disk drive or the pick-up lens drive mechanism in the CD-ROM drive, for example.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A driving apparatus comprising:
   a driven member;
   a shape-memory alloy which is connected to the driven member and forces the driven member to a first direction with a return to a memory shape;
   a force application member which is connected to the driven member and forces the driven member to a second direction opposed to the first direction;
   a driver which supplies a current to the shape-memory alloy; and
   a controller which controls the driver to supply the current for pre-heating prior to an instruction to move the driven member.

2. A driving apparatus according to claim 1, wherein the current for pre-heating causes the temperature of the shape-memory alloy to reach a point at which the shape-memory alloy begins to change its shape or to a slightly lower temperature relative thereto.

3. A driving apparatus according to claim 1, wherein the current at the beginning of the period during which pre-heating occurs causes the temperature of the shape-memory alloy to reach a first temperature, the first temperature being higher than a second temperature at which the shape-memory alloy begins to change its shape.

4. A driving apparatus according to claim 1, wherein the driven member is a shutter of a camera.

5. A driving apparatus according to claim 1, wherein the driven member is a lens unit.

6. A driving apparatus according to claim 1, wherein the force application member is a spring member.

7. A driving apparatus according to claim 1, wherein the force application member is a shape-memory alloy.

8. A control device for controlling an actuator comprising a shape-memory alloy that recovers to prescribed memory dimensions and a force application means that applies an external force to the shape-memory alloy and changes its dimensions, the control device comprising:
   control means which position the actuator at a predetermined position; and
   pre-heating means that, prior to an instruction to start the control of a driven member by the control means, pre-heats the shape-memory alloy.

9. A control device according to claim 8, wherein the pre-heating means heat the shape-memory alloy to a temperature higher than a temperature at which the shape-memory alloy begins to change its shape.

10. A control device according to claim 8, further comprising a stopper that limits a maximum amount of shape change of the shape-memory alloy carried out by the force application means to a prescribed value.

11. A control device according to claim 8, wherein the pre-heating means is constructed such that it stops the supply of current for pre-heating when a first switch is not turned ON after the passage of a prescribed time period after a second switch is turned ON.

12. A control device according to claim 8, wherein the force application means may comprise a shape-memory alloy and the pre-heating means pre-heats one of the shape-memory alloy when current is being supplied to the other shape-memory alloy.

13. A control device according to claim 8, wherein the pre-heating means pre-beat the shape memory alloy to a temperature at which the shape-memory alloy begins to change its shape or to a slightly lower temperature relative thereto.

14. A control method for controlling an actuator comprising a shape-memory alloy that recovers to prescribed memory dimensions and a force application means that applies an external force to the shape-memory alloy and changes its dimensions, the control method comprising:

positioning the actuator at a predetermined position; and pre-heating the shape-memory alloy to a temperature at which the shape-memory alloy begins to change its shape or to a slightly lower temperature relative thereto prior to an instruction to start the controlling step.

* * * * *

UNITED STATES PATENT AND TRADEMARK OFFICE
CERTIFICATE OF CORRECTION

PATENT NO.    : 6,554,501 B2
DATED         : April 29, 2003
INVENTOR(S)   : Akira Kosaka et al.

It is certified that error appears in the above-identified patent and that said Letters Patent is hereby corrected as shown below:

<u>Column 9,</u>
Line 15, change "pre-beat" to -- pre-heat --.

Signed and Sealed this

Twenty-second Day of July, 2003

JAMES E. ROGAN
*Director of the United States Patent and Trademark Office*